United States Patent [19]
Myslivczyk et al.

[11] Patent Number: 5,635,049
[45] Date of Patent: Jun. 3, 1997

[54] EPOXY RESIN BASED COATING COMPOSITION AND METHOD

[75] Inventors: Richard G. Mysliwczyk, Pittsburgh, Pa.; William H. McCarty, Lancaster, Va.; Arthur T. Spencer, Wexford, Pa.

[73] Assignee: The Valspar Corporation, Minneapolis, Minn.

[21] Appl. No.: 485,670

[22] Filed: Jun. 6, 1995

Related U.S. Application Data

[63] Continuation of Ser. No. 322,746, Oct. 13, 1994, abandoned, which is a continuation of Ser. No. 163,607, Dec. 7, 1993, abandoned, which is a continuation of Ser. No. 723,932, Jul. 1, 1991, abandoned.

[51] Int. Cl.$^6$ ................................. C09D 5/44
[52] U.S. Cl. .................. 204/504; 204/489; 205/115; 523/402
[58] Field of Search .................. 204/181.4, 181.7, 204/181.9, 181.1, 489, 504; 523/400, 402; 205/115, 316, 317

[56] References Cited

U.S. PATENT DOCUMENTS

| | | |
|---|---|---|
| 3,308,077 | 3/1967 | Pattivon . |
| 3,816,289 | 6/1974 | Landauer et al. ............... 204/181.4 |
| 3,839,252 | 10/1974 | Bosso et al. ............... 204/181.4 |
| 3,939,051 | 2/1976 | Anderson et al. . |
| 4,064,026 | 12/1977 | Kaufman . |
| 4,164,487 | 8/1979 | Martin ............... 523/400 |
| 4,247,439 | 1/1981 | Matthews et al. . |
| 4,308,121 | 12/1981 | Hazan . |
| 4,316,922 | 2/1982 | Perine et al. ............... 523/410 |
| 4,397,970 | 8/1983 | Campbell et al. . |
| 4,442,246 | 4/1984 | Brown et al. . |
| 4,446,258 | 5/1984 | Chu et al. . |
| 4,476,262 | 10/1984 | Chu et al. . |
| 4,480,058 | 10/1984 | Ting et al. . |

FOREIGN PATENT DOCUMENTS

| | | |
|---|---|---|
| 0111986 | 6/1984 | European Pat. Off. . |

*Primary Examiner*—Melvyn I. Marquis
*Assistant Examiner*—D. Aylward
*Attorney, Agent, or Firm*—Fredrikson & Byron, PA

[57] ABSTRACT

An aqueous coating composition that is particularly adapted for repairing defects in coated metal articles comprises an aqueous dispersion having as its major ingredient an epoxy phosphate ester polymer, a cross-linking agent for the epoxy phosphate ester polymer which may be an aminoplast or phenoplast resin, and an effective quantity of an organic solvent having a solubility parameter in the range of 8.5–10 and being soluble in water at 20° C. to the extent of less than 10%. The composition is desirably electrocoated upon the object at a temperature in the range of from 80° to 120° F. and preferably from about 90°–100° F.

2 Claims, No Drawings

5,635,049

EPOXY RESIN BASED COATING COMPOSITION AND METHOD

This application is a continuation of application Ser. No. 08/322,746, filed on Oct. 13, 1994, abn which is a continuation of Ser. No. 08/163,607, filed Dec. 7, 1993, abn which is a continuation of Ser. No. 07/723,932 filed Jul. 1, 1991 abn.

FIELD OF THE INVENTION

This invention relates to epoxy resin-based, aqueous coating compositions for electrocoating metal objects, and particularly to compositions adapted for repairing defects in previously coated metal objects such as food and beverage can bodies and ends.

BACKGROUND OF THE INVENTION

Food and beverage can bodies and ends often are made from metal sheeting that has been precoated with a polymer coating to prevent contact of the metal with the contained food or beverage. Defects often appear in heavily fabricated areas of the can bodies and ends. If not repaired, such defects may lead to corrosion and potential spoilage. Coating defects in these metal parts customarily are repaired by spraying, dipping or electrocoating the parts; of these methods, the electrocoating process is the most efficient because it preferentially coats in the area of defects.

Electrocoating compositions commonly include polymers made from derivatives of methacrylic acid, acrylic acid and styrene, and compositional ranges of these materials approved for contact with food are set out in 21 CFR 175-300. Examples of such compositions are found in U.S. Pat. Nos. 4,308,121 (Hazan) and 3,939,051 (Anderson et al.). Other coating compositions used for electrocoat repair have employed minor amounts of epoxy ester resins in combination with maleinized oils. These coating materials are not completely satisfactory because they exhibit less than optimum resistance to aggressive foods such as sauerkraut and tomato products.

U.S. Pat. Nos. 4,598,109 and 4,425,451 (both Sekmakas, et al.) refer to water-dispersible epoxy-phosphate ester polymer salts that are used in combination with aminoplast or phenoplast resins. In these references, an epoxy resin is reacted with less than a stoichiometric quantity of phosphoric acid to provide an epoxy phosphate ester, the remaining oxirane groups of which are reacted with a volatile amine to provide a water-dispersible product lacking oxirane functionality. U.S. Pat. No. 4,461,857 (Sekmakas, et al.) shows a similar coating material which includes from 25–85% of a carboxyl-functional, organic solvent-soluble copolymer salt with a volatile amine. U.S. Pat. No. 4,397,970 (Campbell, et al.) describes an improved process for preparing epoxy resin/phosphoric acid reaction products which are manufactured using an intermediate blocking agent. U.S. Pat. No. 4,164,487 (Martin) refers further to coatings containing water-thinable, base-neutralized phosphoric acid/polyether epoxide reaction products employing two or more epoxy resins.

SUMMARY OF THE INVENTION

The present invention provides an aqueous coating composition that is particularly well adapted for use in the electrocoating of metal objects having coating defects. The composition comprises an aqueous dispersion of:

(a) an epoxy phosphate ester polymer that is the reaction product of a 1,2-epoxy resin and phosphoric acid, this polymer preferably being the major non-volatile ingredient of the aqueous dispersion, (b) a sufficient quantity, typically from 5–30% by weight based on the weight of the epoxy phosphate ester, of a cross-linking agent therefor to cross-link and essentially completely cure the epoxy phosphate ester upon application of heat to a coating of the composition, and (c) not less than 0.1% and preferably at least about 0.75% by weight, based on the weight of the aqueous dispersion, of an organic solvent having a solubility parameter in the range of 8.5–10 and solubility in water of less than 10%.

Ingredient (c), the organic solvent having a solubility parameter in the range of 8.5–10 and solubility in water of less than 10%, has been found to be of particular importance in the compositions of the invention in that compositions containing this ingredient have exhibited a surprising ability to repair coating defects.

The invention also relates to a method of electrocoating a metal object having coating defects, the method including the step of electrocoating the metal object with a coating composition comprising an aqueous dispersion of an epoxy phosphate ester polymer that is the reaction product of a 1,2-epoxy resin and phosphoric acid, the dispersion containing a cross-linking agent for the epoxy phosphate ester in sufficient quantity, typically from 5–30% by weight based on the weight of the epoxy phosphate ester polymer, to cross-link and to substantially completely cure the epoxy phosphate ester in a coating of the composition applied to a substrate. The aqueous dispersion further and importantly contains not less than 0.1% and preferably at least 0.75% by weight, based on the weight of the aqueous dispersion, of an organic solvent having a solubility parameter in the range of 8.5–10 and solubility in water of less than 10%. The method includes electrocoating the object at a temperature sufficient to afford effective coating and repair of the defects, desirably in the range of about 90°–100° F.

DESCRIPTION OF THE PREFERRED EMBODIMENT

The epoxy phosphate ester polymers that are employed in the present invention are the reaction products of 1,2-epoxy resins and phosphoric acid, and are desirably the major non-volatile ingredients of the aqueous dispersions. The epoxy resin precursor desirably has an equivalent weight of from 200 to 4000 and an epoxy equivalency not greater than two. Reference is made to U.S. Pat. No. 4,164,487 and especially to U.S. Pat. No. 4,397,790 (Campbell et al.) for disclosure of epoxy phosphate ester resins and their method of manufacture, the teachings of which are incorporated herein by reference. Briefly, phosphoric acid may be provided as an acid source material derivable by the reaction of a hydroxylic P—OH functionality-limiting agent (a blocking agent) with phosphoric anhydride as such or as a reaction product thereof with a limited amount of water, the epoxide/acid reaction proceeding in the absense of water. Then, enough water may be added to hydrolyze the resulting phosphopolyesters, generating phosphomonoesters and the P—OH groups needed for salification with an amine, of which enough is used to enable the polymer to be dispersed in water. The epoxy phosphate ester product preferably is free of unreacted oxirane groups.

As mentioned above, the coating compositions of the invention are in the form of aqueous dispersions having fairly low solids concentrations typically on the order of 10%; the coating compositions have a polymeric component including an epoxy phosphate ester polymer as described above, and its concentration in the aqueous dispersion ranges from 1% to about 20% by weight, and preferably 5–15% by weight. The epoxy phosphate ester polymer desirably is the major coating component in the coating composition (distinguishing, of course, resinous curing agents such as the melamines, phenyl formaldehyde resins, and the like), that is, the epoxy phosphate ester desirably constitutes over 50% by weight of the coating composition polymeric solids. The polymeric coating compositions employed in the dispersions of the present invention preferably consist essentially of one or more epoxy phosphate ester polymers.

Various curing agents for epoxy resins can be employed in the coating compositions of the present invention and are used at a concentration sufficient to cause substantially complete curing of the epoxy phosphate resin when the coating composition is coated on a substrate and cured at appropriate temperatures, e.g., 400° F. Phenoplast and aminoplast curing agents can be employed in the compositions of the present invention. Aminoplast resins are the condensation products of an aldehyde such as formaldehyde, acetaldehyde, crotonaldehyde, and benzaldehyde with an amino- or amido group-containing substance such as urea, melamine and benzoguanamine. Products obtained from the reaction of alcohols and formaldehyde with melamine, urea or benzoguanamine are desired in the aqueous-based coating compositions of the invention because of their good water dispersibility. Useful alcohols include the monohydric alcohols such as methanol, ethanol, propanol, butanol, hexanol, benzyl alcohol, cyclohexanol, and ethoxyethanol. Urea-formaldehyde and etherified melamine-formaldehyde curing agents are preferred. Particularly preferred are the ethoxy methoxy melamine formaldehyde condensation products, exemplary of which is American Cyanamid's CYMEL® 1116 curing agent. Phenoplast resins include the condensation products of an aldehyde with a phenol. Formaldehyde and acetaldehyde are preferred aldehydes. Various phenols can be employed such as phenol, cresol, p-phenylphenol, p-tert-butylphenol, p-tert-amylphenol, and cyclopentylphenol.

The curing agents—preferably phenoplast or aminoplast resins—desirably are used in an amount ranging from 5% to about 30% by weight and preferably 10% to 25% by weight based upon the weight of the epoxy phosphate ester polymer. The phenoplast and aminoplast resins themselves are generally at least moderately soluble or at least readily dispersible in water.

A key ingredient of the coating compositions of the present invention, although used in small amounts, is an organic solvent having a solubility parameter in the range of 8.5–10 and having a solubility in water at 20° C. of less than 10%, referred to sometimes hereafter as "SP solvents." Solubility parameters are well known in the art, and are defined, for example, by Grulke, Eric, "Solubility Parameter Values," in Brandrup, J. and E. H. Immergut, eds., *Polymer Handbook*, 3rd Edition, John Wiley & Sons, New York, 1989, pp. 519 et seq. Preferred SP solvents exhibit solubility parameters of 9.0 or above and preferable in the range of 9.0 to 9.5. Particularly preferred is 2-ethylhexanol, having a solubility parameter of 9.5. Other preferred SP solvents and their solubility parameters include methyl n-amyl ketone (9.0), Ektasolve EEH (ethylene glycol mono-2-ethyl hexyl ether) (9.2), and Hexyl Cellosolve (ethylene glycol hexyl ether) (9.6). The solubility of SP solvents in water at 20° C. is less than 10% and preferably is less than 2% by weight.

The amount of added SP solvent may vary widely, depending, among other things, upon the concentration of polymer in the aqueous dispersion. Amounts of SP solvent as small as 0.1% of the aqueous dispersion are believed to have a beneficial effect upon the compositions of the invention, and SP solvents may be employed at concentrations ranging from 0.1% to about 5% by weight based upon the weight of the aqueous dispersion. Preferably, the aqueous dispersion contains at least about 0.75% by weight of the SP solvent, and most preferably in the range of about 1% to about 2%. Aqueous coating compositions of the invention containing about 1% by weight of an SP solvent have been employed with substantial success. Put another way, the SP solvent ingredient desirably is present in an amount ranging from about 7.5% to 20% and preferably at least about 10% of the weight of the epoxy phosphate ester polymer. Other organic solvents, of course, can additionally be employed, but for environmental and non-pollution reasons, it is desired to use as little in the way of organic solvents as possible. The present invention in a preferred embodiment provides an aqueous coating composition which contains no more than about 10% and preferably not more than about 7% of an organic solvent.

The aqueous coating compositions of the invention may be prepared by combining ingredients in any desired manner, but it has been found particularly desirable to first combine the epoxy phosphate ester resin with a sufficient quantity of a volatile amine so as to promote appropriate dispersion of the polymer in water. To the resulting mixture may be added the curing agent, and finally water in small portions over a period of time and with mixing to provide an appropriate dispersion. To the dispersion then is added a further quantity of water and an SP solvent as described above.

The invention may be more readily understood and appreciated by reference to the following non-limiting examples. All parts are given by weight.

EXAMPLE 1

As a comparative example, an acrylic electrocoat resin was prepared by charging 305.1 grams of butanol and 914 grams of Ektasolve EP to a 5-liter, round bottom flask equipped with stirrer, reflux condensor, thermometer, addition funnel, heating mantel and nitrogen inlet. Ektasolve EP is ethylene glycol monopropyl ether, a product of Eastman Chemical Products, Inc., having a solubility parameter of 11.1.

A premix was made of 406.8 parts of methacrylic acid, 1,018.4 parts of butyl acrylate, 1,112.8 parts of styrene, 176.4 parts of 2-hydroxyethylmethacrylate and 39.5 parts of t-butyl perbenzoate. Nitrogen flow was started and the flask was heated to 121° C. at which point 10% of the premix was added and heating continued to reflux, 130° C. The remaining premix was added uniformly over a 2-hour period while maintaining reflux at a temperature of 130°–138° C.

After completion of the premix addition, the batch was held an additional 1½ hours at reflux, following which 4.1 parts of t-butyl perbenzoate was added. The reactor temperature was maintained for an additional hour at reflux to complete the polymerization. Thereafter, 95.4 parts of Hexyl Cellosolve, 59.0 parts of Ektasolve EP and 368.5 parts of butanol were added, the resulting solution having a solids content of 61%, an acid number of 97 and a viscosity of 14,700 centipoises.

To a 5-liter round bottom flask equipped with stirrer, reflux condensor, thermometer, addition funnel, heating mantle and nitrogen inlet was added 1,978.4 parts by weight of the acrylic resin solution prepared above. Nitrogen flow was started and the charge was heated to 50° C. under good agitation. To the flask was then added 74.5 parts of dimethylethanolamine, followed by 166.3 parts of Cymel 325, a melamine formaldehyde products of American Cyanamid Company. Deionized water, 1,580.8 parts, was then added slowly over approximately 1 hour under high agitation. As the water was thus added, the heat was turned off and the batch temperature was allowed to drop. The resulting dispersion had a determined solids content of 33.3%, viscosity of 15,200 centipoise, a pH of 7.85 and an acid number of 94.

Finally, to 1,884.8 parts by weight of the dispersion was added 62.1 parts of 2-ethylhexanol, 62.1 parts of methyl amyl ketone and 4,391.0 parts of deionized water to produce an electrocoat composition.

EXAMPLE 2

This example describes the manufacture of an electrocoat bath of the invention employing 2-ethylhexanol as the SP solvent.

To a 12-liter flask equipped with heating mantle, stirrer, reflux condensor, thermometer, nitrogen inlet, and addition funnel was added 4,028.4 parts by weight of XD 8096.07, an epoxy phosphate ester polymer product of the Dow Chemical Company having a reported molecular weight of about 8000 and a viscosity in Butyl Cellosolve at 70% solids of 19,000 cps. Nitrogen flow was started and the charge was heated to 80° C. under good agitation. Dimethylethanolamine, 43.8 parts, was added over approximately 5 minutes, followed by the addition of 805.0 parts of Cymel 1116, a trademarked amine formaldehyde condensation product of American Cyanamid Company. The batch was stirred for 15 minutes to assure uniformity, and then 5,122.8 parts of deionized water was added over a 1-hour period with the first third added over a 20-minute time period. Heating was discontinued after the first one-third of the water was added, and the batch temperature was allowed to drop with subsequent water addition. The resulting dispersion had a determined solids of 31.8%, a pH of 7.95 and a viscosity of 98 centipoises.

To 1,992.3 parts of the thus prepared dispersion were added 4,343.7 parts of deionized water and 64 parts of 2-ethylhexanol, the resulting well stirred electrocoat bath having 10% solids by weight and the cross-linking agent being present at 10% of the epoxy phosphate polymer weight.

EXAMPLES 3–13

Example 2 was duplicated exactly except that the type of SP organic solvent and the amount of cross-linking agent was varied, as shown in the table below.

Coating and Evaluation

The coating compositions of each of Examples 1–13 were electrocoated onto can ends under the conditions set out in the following table. The coating time for each composition was 2 seconds, and the voltage was varied from about 50 volts DC to 300 volts DC for the purpose of obtaining an appropriate coating weight. Coating weights on the order of 10 mg per end and below are desired, both for economic purposes and for ease of subsequent curing of the coating. The electrocoat bath temperature similarly was varied from example to example. It will be noted that the higher bath temperatures in general provided the better coatings. Bath temperatures of 85° or above are preferred, and temperatures of at least 95° provided excellent results.

Each of the coatings was cured for 1 minute at 400° F. in a forced air oven, and was then subjected to a residual conductivity test. In this test, a coated can end is placed against a 1% saline solution and a voltage of 6.3 volts DC is applied across the can end. After 4 seconds, the current leakage across the coating is measured and is reported in terms of milliamperes. In general, residual electrical conductivity should be less than 15 milliamperes per can end for acceptable defect repair, and most preferably should be less than 10 milliamperes.

Certain of the coatings were subjected to a blush or whitening test in which a coated container container or can end specimen is contacted with deionized water at 250° F. for 90 minutes. After drying and cooling of the specimen, the amount of whitening if any that has occured is visually observed and is rated on a scale of increasing excellence of from zero to ten, zero designating a white, opaque coating and 10 indicating no visible change in the transparency of the coating.

| Example | Solvent Added,[1] % of Bath | Solvent Solubility Parameter | Solubility of Solvent in Water % | Crosslinking Agent, % of Epoxy Phosphate | Bath Temp., (°F.) | Voltage Applied, Volts DC | Coating Weight, Mg/End | Residual Conductivity, Milliamperes | Blush Resistance |
|---|---|---|---|---|---|---|---|---|---|
| 1 | 1% MAK[2] + | 9.0 | 0.5 | 10% Cymel 325 | 82 | 50 | 7.7 | 15 | 10 |
|   | 1% 2EH | 9.5 | 0.1 | | | | | | |
| 2 | 1% 2EH | 9.5 | 0.1 | 10% Cymel 1116 | 82 | 200 | 9.5 | 9 | 10 |
| 3 | 1% 2EH | 9.5 | 0.1 | 23% Cymel 1116 | 85 | 250 | 10 | 14 | 9 |
| 4 | 1% 2EH | 9.5 | 0.1 | 23% Cymel 1116 | 95 | 200 | 7 | 5 | 10 |
| 5 | 1% 2EH | 9.5 | 0.1 | 23% Cymel 1116 | 95 | 200 | 6 | 3 | 10 |
| 6 | 1% DOWANOL PM[2] | 10.4 | Infinite | 10% Cymel 1116 | 85 | 100 | 11 | 63 | 0 |
| 7 | 1% 2EH | 9.5 | 0.1 | 10% Cymel 1116 | 82 | 200 | 6 | 7 | 5 |
| 8 | 1% BuCarbitol | 8.9 | Infinite | 10% Cymel 1116 | 85 | 150 | 11.8 | 78 | — |
| 9 | 1% BuCellosolve | 9.8 | Infinite | 10% Cymel 1116 | 82 | 275 | 9.5 | 55 | — |
| 10 | 1% Butanol[2] | 11.6 | 7.9 | 10% Cymel 1116 | 82 | 275 | 9.4 | 57 | — |
| 11 | 1% Texanol | 8.2 | 0.0 | 10% Cymel 1116 | 82 | 300 | 7.3 | 48 | — |
| 12 | 1% Ektasolve EEH | 9.2 | 0.2 | 10% Cymel 1116 | 82 | 125 | 3.6 | 14 | — |
| 13 | 1% Hex Cellosolve | 9.6 | 1.0 | 10% Cymel 1116 | 82 | 300 | 7.5 | 17.8 | — |

[1]MAK = methyl amyl ketone; 2EH = 2-ethyl hexanol; DOWANOL PM = propylene glycol methyl ether; Butyl Carbitol = diethylene glycol butyl ether; Butyl Cellosolve = ethylene glycol butyl ether; Texanol = 2,2,4-trimethyl-1,3-pentanediol monoisobutyrate; Ektasolve EEH = ethylene glycol mono-2-ethyl hexyl ether; Hexyl Cellosolve = ethylene glycol hexyl ether.
[2]Comparative examples.

While a preferred embodiment of the present invention has been described, it should be understood that various

We claim:

1. Method for electrocoating a coated metal object having coating defects, which comprises the steps of
   a. providing a coating composition comprising an aqueous dispersion of an epoxy phosphate ester polymer that is the reaction product of a 1,2-epoxy resin and phosphoric acid, a sufficient quantity of a cross-linking agent therefor to cross-link and essentially completely cure the epoxy phosphate ester upon application of heat to a coating of the composition, and not less than 0.1% by weight, based on the weight of the aqueous dispersion, of an organic solvent having a solubility parameter in the range of 8.5–10 and solubility in water of less than 10%, and
   b. electrocoating said object in the coating composition at a temperature sufficient to cause coating of said defects to repair the same.

2. The method of claim 1 wherein the coating temperature ranges from about 90° F. to about 100° F.

* * * * *